Jan. 16, 1940.  W. A. UTTZ, SR  2,187,001
ANIMAL TRAP
Filed Oct. 17, 1938
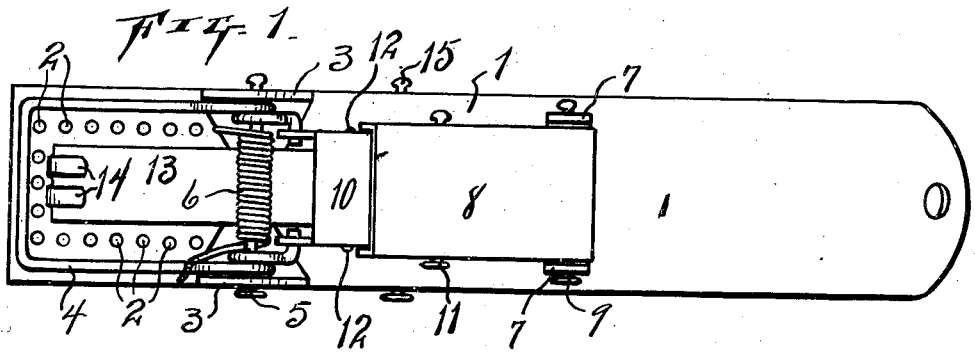
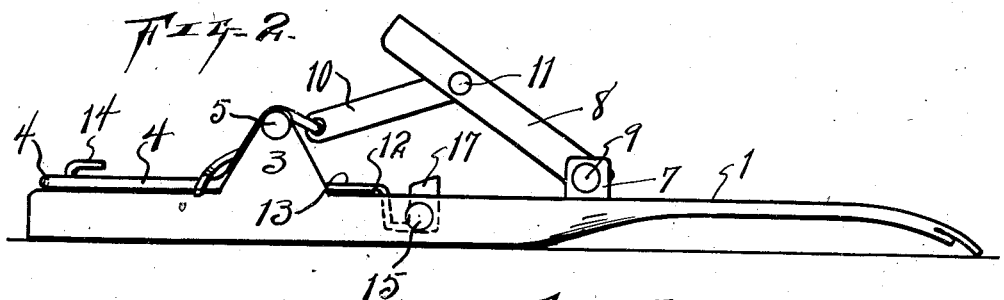
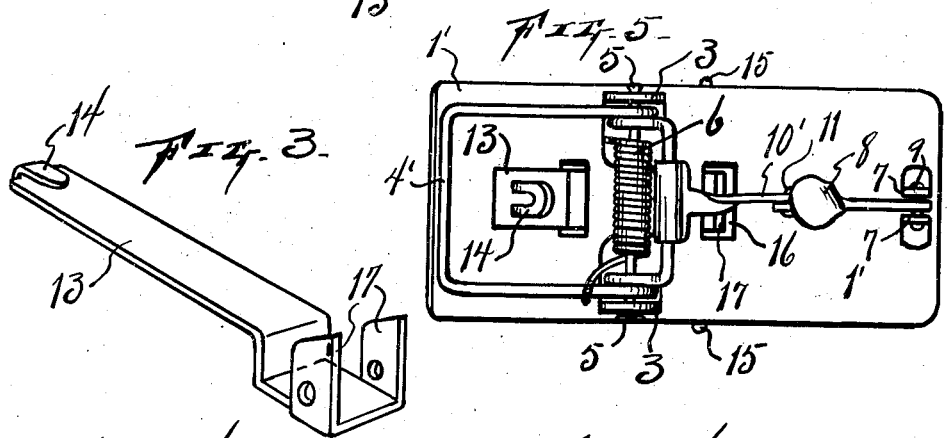
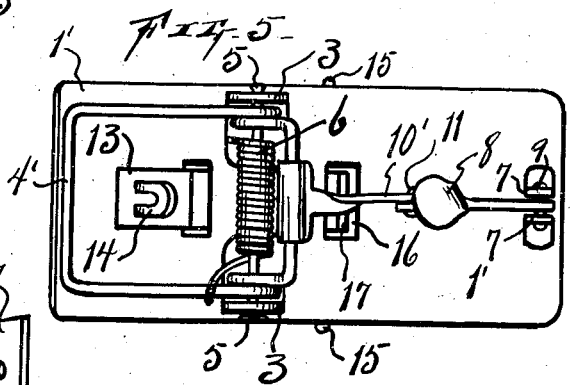
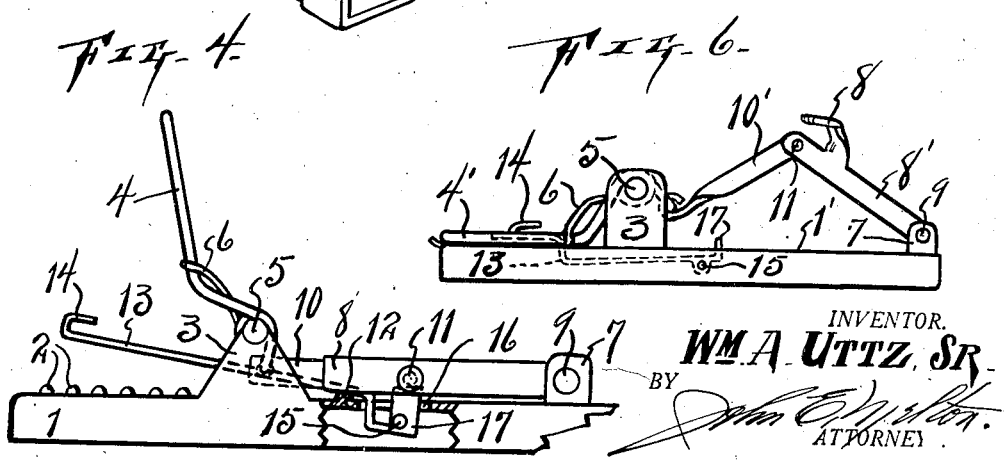
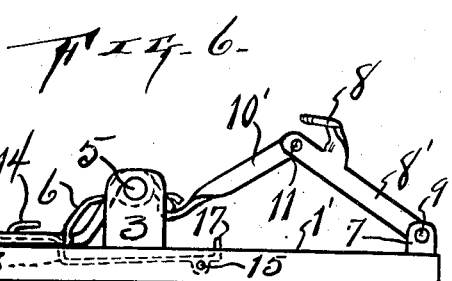
INVENTOR.
WM. A. UTTZ, SR.
BY
ATTORNEY Patented Jan. 16, 1940

2,187,001

UNITED STATES PATENT OFFICE 2,187,001

ANIMAL TRAP

William A. Uttz, Sr., Fort Worth, Tex., assignor to H. L. Collins, Sr., Fort Worth, Tex.

Application October 17, 1938, Serial No. 235,464

2 Claims. (Cl. 43—83.5)

My invention relates to animal traps and more particularly to a rat or mouse trap which is constructed so that the housewife may manipulate the same with a minimum amount of handling.

An object of this invention is to provide a trap which is constructed so that it may be set by the mere pressure of the foot of the operator.

Another object is to provide a trap which may be emptied of its catch without the operator having to handle the animal caught or touch any portion of the trap that is used to hold the animal.

An advantage of this trap is that it is extremely sensitive when set and is positive in operation.

Another advantage of this invention is that it is simple in structure and so formed as to be readily cleaned.

Still another advantage of this invention is that a minimum number of parts are used in the structure, thus insuring a long life of operation.

Other objects and advantages will be fully explained in the following description and the invention will be more particularly pointed out in the claims.

Reference is had to the accompanying drawing which forms a part of this application:

Fig. 1 is a plan view of the trap.

Fig. 2 is an edge view of the same.

Fig. 3 is a perspective view of the trigger of the trap, shown on a smaller scale and illustrating a variation in the bait holding portion thereof.

Fig. 4 is an edge view of a portion of the trap, showing the same in "set" position.

Fig. 5 is a plan view of a variation in the structure of the trap.

Fig. 6 is an edge view of the same, showing the position of the members thereof in dotted outline to indicate "set" position.

Similar characters of reference are used to indicate the same parts throughout the several views.

The trap consists of a base member 1 which, in this instance, is formed of metal and provided with a plurality of raised integral prongs 2 adjacent the trigger portion of the trap. The sides or edges of the member 1, adjacent the trigger and its cooperating parts, are turned downwardly to form a support for the base 1. The rear portion or that end of the base 1 which is opposite the trigger is formed with a slight curve so as to engage the floor or supporting surface for the trap and balance the trap. This end of the trap may be used for advertising purposes as well as some portions of the mechanism thereof.

The base 1 is of elongated rectangular form having died out portions which are turned upwardly and adapted to serve as bearings 3. A U shaped jaw member 4, preferably of heavy wire, is pivotally supported on the bearings 3 by means of a bolt 5. The body of the U shaped jaw member 4 is adapted to normally rest upon the surface of one end of the base member 1. The free ends of the member are each curled around the bolt 5, adjacent the bearing members 3. The extreme ends of the U member 4 are bent towards each other and parallel with the rod or bolt 5. A coil spring 6 is carried around the bolt or rod 5 and interposed between the coiled portions of the U shaped member 4. One end of the spring 6 is passed through the space from which one of the bearings 3 was died out, and the other end of the spring is bent to pass over one arm of the member 4. This coil spring 6 normally resiliently holds the member 4 in engagement with the surface of the member 1, as shown in Figs. 1 and 2.

A pair of members 7 are made integral with the surface 1 and disposed approximately midway of the length thereof. These members 7 serve as bearing supports for a flat elongated surface or lever 8. One end of the surface or lever 8 is pivotally connected to the bearings 7 by means of a bolt 9. The other end of the member 8 is adapted to point in the direction of the front end of the base member 1. A link connection 10 is provided between the free end of the member 8 and the extreme ends of the member 4. The link connection 10 is formed similar to the member 8. It consists of a flat piece of material having its sides turned at right angles to its body portion. One end is adapted to be engaged by the extreme free ends of the member 4, in a pivotal manner, and the other end is pivoted to the free end of the member 8 by means of a bolt 11. This bolt 11 is passed through the sides of the member 8 adjacent the end thereof. The pivotal connection of the member 8 with the U shaped jaw member, by means of the link connection 10, serves to move the member 4 in setting the trap. When the member 8 is pushed downward it will overcome the tension of the spring 6 and raise the U shaped jaw member to the position shown in Fig. 4. When the trap mechanism is in the position shown in Fig. 4, the pivotal bolt 11 is slightly below an imaginary line passing through the center of the pivotal points of the bolt 9 and the free ends of the jaw member 4. When the two members 8 and 10 are in this position, their break at the bolt 11 is past center and the tension of the spring 6 then tends to force the members 8 and 10 to maintain their position adjacent the base member 1, as shown in Fig. 4. The two members 8 and 10 form a toggle joint which is adapted to actuate the lever and jaw for setting and holding the same in operative position. A died up projection 12 may be made in the base member 1 upon which the link connection 10 may rest when the trap is set. The height of this projection may be varied in order to control the extent to which the pivotal point may pass the center or pass a line drawn through the two points as previously stated.

The trigger mechanism of the device consists of an elongated flat piece of material 13. The front end of the trigger 13 is adapted to normally lie upon the surface of the base member 1 between the arms of the U-shaped jaw member 4. This end of the trigger may be provided with integral curved prongs 14 or other suitable projections which will serve to anchor bait. The other end of the trigger is extended to a position where it may be engaged by the rod 11 when the members 8 and 10 are in position for setting the trap. A portion of the base 1 is cut out, directly under the point where the rod 11 engages the trigger, so that that end of the trigger may be bent to pass under the base 1 in a position where it may be pivotally connected to the side walls of the base 1 by means of a pivotal bolt 15. The trigger member is bent downward so that it will pass through the opening 16 of the base 1. The extreme end of the trigger is then bent parallel with the body 1. The sides of the member 13 are turned upward to serve as a means for pivotal connection with the sides of the base 1. These upward projections 17 are pivotally connected to the base 1 by means of a bolt 15. The bolt 15 passes through the side walls of the base 1, and through the projections 17. The upper ends or edges of the projections 17 are adapted to be engaged and forced downwardly when the members 8 and 10 are moved to the position shown in Fig. 4. When the members 8 and 10 are in this position the front end of the bait holding lever 13 is raised as shown in Fig. 4. When an animal touches the front end of the bait holding lever, the pivotal connection of the two members 8 and 10 will be raised past the center of their swing and the tension of the spring 6 will again force the jaw member 4 to swing back to normal rest upon the face of the base member 1.

The variation in the structure of the trap, as shown in Figs. 5 and 6 embodies the same principle of operation as that of the trap described above. In this instance, the base 1' is shortened to merely support the operating parts and there is no elongation of the same to provide a handle and advertising space. The free ends of the arms of the jaw member 4' are extended to abut each other and the connecting link 10' is bent to pass around the ends. The link, in this instance is a narrow piece of material which is pivotally connected to a similar narrow strip of material that forms the member 8'.

The handle is curved at its extreme rear end to form a natural grip for the operator and so formed that his thumb will rest upon the member 8 so that he may press downwardly and actuate the toggle joint for setting the trap. This grip also facilitates the release of an animal from the trap without the necessity of the operator having to touch the animal.

The conventional animal trap is provided with hook type of mechanism for setting that in time will become worn and inoperative. This type of animal trap with the toggle joint setting means will last practically indefinitely due to the fact that the lever 13 merely acts to break the toggle joint and permit the striker 4 to return to normal position. The lever 13 merely engages the joint and breaks the same in order for the striker 4 to function. The members 8 and 10 form the toggle joint and their movement controls the movement of the striker 4 in a snap action movement. The spring 6 either urges the striker 4 to maintain its normal position or its "set" position, therefore the spring 6 also tends to resiliently control the position of the toggle joint members 8 and 10.

It is obvious that various changes may be made in the design and arrangement of the various portions and mechanism of the trap without departing from the principle of operation of the same. This fact is apparent when comparing the two traps illustrated in Figs. 1 and 5. The surface of the front end of the base 1 of the trap shown in Figs. 1, 2 and 4 is provided with projections 2 which serve as obstructions and assist the striker 4 in holding the animal. These obstructions may be varied in design and position. The extreme front end of the base surface of the trap shown in Figs. 5 and 6 is turned upwardly to serve for the same purpose. This edge cooperates with the jaw 4' to hold the animal.

The limit to which the toggle joint may be moved to a setting position may be controlled by either the indentations 12 or by either placing an indentation (not shown) in the front edge of the member 10 or by bending this edge downward. The indentation 12 in the base 1 will limit the position of the member 8 relative to the base 1. The bent edge of the member 10 or an indentation therein will limit the extent to which the toggle members may be moved past center in moving the same to a setting position. Either the indentations or the bend of the member 8 will regulate the extent trigger or lever 13 is raised.

What I claim is:

1. An animal trap comprising a base, a spring actuated jaw pivotally supported on the base, toggle means pivotally connected to the jaw and to the base, trigger and bait holding means pivotally connected to the base and having a portion thereof positioned in the path of movement of the toggle means, said toggle means being so constructed and arranged that movement thereof in one direction only will effect contact of a portion thereof with a part of the trigger and bait holding means to raise the same and the jaw to set position and maintain the jaw and trigger in such position solely by overhead contact of the toggle means with the trigger.

2. An animal trap having a base, a spring controlled jaw pivotally supported on the base, a lever pivoted on the base, link means connecting the lever and the jaw, a bait holding trigger pivoted on the base, a pivot between one of the link means and the lever, said pivot being so positioned relative to the base and trigger that movement thereof in one direction will cause contact of the pivot with the trigger, swing the jaw to set position and maintain the jaw in that position until released.

WILLIAM A. UTTZ, Sr.